US012102219B1

(12) United States Patent
Saccoccio et al.

(10) Patent No.: US 12,102,219 B1
(45) Date of Patent: Oct. 1, 2024

(54) BRUSH AND HANDLE

(71) Applicant: Asia Connection LLC, New York, NY (US)

(72) Inventors: Mitch Saccoccio, Hays, NC (US); Jonathan Bonelli, New York, NY (US); Daniel Schonfeld, Westport, CT (US)

(73) Assignee: Asia Connection LLC, New York, NY (US)

( * ) Notice: Subject to any disclaimer, the term of this patent is extended or adjusted under 35 U.S.C. 154(b) by 0 days.

(21) Appl. No.: 18/689,979

(22) PCT Filed: Nov. 7, 2023

(86) PCT No.: PCT/US2023/036936
§ 371 (c)(1),
(2) Date: Mar. 7, 2024

Related U.S. Application Data

(60) Provisional application No. 63/460,183, filed on Apr. 18, 2023.

(51) Int. Cl.

| | |
|---|---|
| ***A46B 5/00*** | (2006.01) |
| ***A46B 7/06*** | (2006.01) |
| ***A46B 9/02*** | (2006.01) |
| ***A46B 9/06*** | (2006.01) |
| ***A46D 1/00*** | (2006.01) |
| ***B25G 3/30*** | (2006.01) |
| ***E04H 4/16*** | (2006.01) |

(52) U.S. Cl.
CPC .............. *A46B 5/0012* (2013.01); *A46B 7/06* (2013.01); *A46B 9/026* (2013.01); *A46B 9/06* (2013.01); *A46D 1/0207* (2013.01); *B25G 3/30* (2013.01); *E04H 4/1609* (2013.01); *A46B 2200/3073* (2013.01)

(58) Field of Classification Search
CPC ......... A46B 9/026; A46B 9/02; A46B 5/0095; A46B 5/0075; A46B 5/0012; A46B 7/06; E04H 4/1609
See application file for complete search history.

(56) References Cited

U.S. PATENT DOCUMENTS

| | | | | | |
|---|---|---|---|---|---|
| 2,083,134 | A * | 6/1937 | Wood | A46B 9/00 | 15/160 |
| 3,273,187 | A * | 9/1966 | Williams | E04H 4/1636 | 15/375 |
| 3,296,643 | A * | 1/1967 | Fortune | E04H 4/1609 | 15/160 |
| 4,176,419 | A * | 12/1979 | MacDonald | E04H 4/1609 | 15/160 |
| D257,521 | S * | 11/1980 | Piero | D4/118 | |
| 4,479,277 | A * | 10/1984 | Gilman | A46B 15/0081 | 15/160 |

(Continued)

*Primary Examiner* — Shay Karls

(74) *Attorney, Agent, or Firm* — Dilworth & Barrese, LLP

(57) ABSTRACT

A brush has a brush head having a main body and bristles extending therefrom, with the main body having a cylindrical shaft with a rounded cylindrical circumference. Semispherical bodies having bristles extending therefrom are adapted to be removably secured to axially opposite ends of the main body. These bristles radially extend 360° around both the cylindrical circumference of the main body and each semispherical body. A handle for the brush and an adapter for coupling the brush to a handle, are also provided.

16 Claims, 8 Drawing Sheets

(56) References Cited

U.S. PATENT DOCUMENTS

| | | | | | |
|---|---|---|---|---|---|
| 4,637,087 | A * | 1/1987 | Feinberg | E04H 4/1609 | 15/160 |
| 4,703,535 | A * | 11/1987 | Nehls | E04H 4/1609 | 15/160 |
| 4,733,427 | A * | 3/1988 | Conrad | E04H 4/1609 | 15/160 |
| 4,783,868 | A * | 11/1988 | O'Callaghan | A46B 15/00 | 15/160 |
| D351,948 | S * | 11/1994 | Getchell | D4/118 | |
| 5,487,397 | A * | 1/1996 | Bean | E04H 4/1609 | 15/160 |
| 6,148,466 | A * | 11/2000 | Smitelli, III | E04H 4/1609 | D4/130 |
| 8,528,146 | B1 | 9/2013 | Abrahamson | | |
| 8,707,503 | B2 * | 4/2014 | Saccoccio | A46B 9/026 | 15/160 |
| 8,943,640 | B2 * | 2/2015 | Saccoccio | E04H 4/1609 | 15/160 |
| 2021/0396030 | A1 | 12/2021 | Eslami-Novin | | |
| 2022/0064978 | A1 | 3/2022 | Saccoccio et al. | | |
| 2023/0113080 | A1 | 4/2023 | Hetzner | | |

* cited by examiner

BRUSH AND HANDLE

BACKGROUND

1. Field of the Invention

This invention relates to cleaning devices, notably swimming pool cleaning devices, and in particular to a cylindrical swimming pool brush head having rounded ends with bristles perpendicularly mounted along the rounded sides so that hard to reach narrow angled areas such as corners, stairs, and seat areas can be cleaned.

2. Background of the Art

Swimming pool brushes have been around for many years. Most traditional brushes have an elongated handle connected to a brush head. See for example U.S. Pat. No. D351,948 to Getchell; U.S. Pat. No. 3,296,643 to Fortune; U.S. Pat. No. 4,637,087 to Feinberg; U.S. Pat. No. 4,703,535 to Nehls; U.S. Pat. No. 4,733,427 to Conrad; U.S. Pat. No. 4,783,868 to O'Callaghan; and U.S. Pat. No. 5,487,397 to Bean. However, these references are limited to having bristles oriented generally downward, and are not capable of adequately cleaning all corners where walls and floors come together, areas where different planar walls intersect, edge areas where walls meet floors, and around stairs, seats and the like.

U.S. Pat. No. Des. 257,521 to Piero; and U.S. Pat. No. 4,176,419 to MacDonald each describe other pool brushes where the bristles are only oriented about part of the perimeter edges of the brush head, and are also not capable of adequately cleaning all corners where walls and floors come together, areas where different planar walls intersect, edge areas where walls meet floors, around stairs, seats and the like.

U.S. Pat. No. 2,083,134 to Wood shows a complex brush for "cleaning vats" having separately positioned bristle heads attached to two parallel brush heads, and also would not appear to be capable of adequately cleaning all corners where walls and floors come together, areas where different planar walls intersect, edge areas where walls meet floors, around stairs, seats and the like.

U.S. Pat. No. 3,273,187 to Williams shows a triangular "vacuum cleaner head" of bristles that would be difficult to maneuver and use for adequately cleaning all corners where walls and floors come together, areas where different planar walls intersect, edge areas where walls meet floors, around stairs, seats and the like.

U.S. Pat. No. 4,479,277 to Gilman et al. describes a scrub pad brush with downwardly oriented bristles and one side edge having rounded edge bristles. However, Gilman requires a handle parallel to a small rectangular pad brush head with only rounded bristles on one side edge and does not describe any application for cleaning pools and can not be used for adequately cleaning all corners where walls and floors come together, areas where different planar walls intersect, edge areas where walls meet floors, around stairs, seats and the like.

U.S. Pat. No. 6,148,466 to Smitelli, III et al. discloses a pool brush having a cylindrical body with semi-spherical rounded ends. The bristles, when the head is seen in cross section, extend about 280 degrees around the body with the body having a flat portion in top.

U.S. Pat. Nos. 8,943,640 and 8,707,503 to Saccoccio et al. disclose pool brushes having an oblong-shaped, cylindrical portion with curved ends and having bristles circumferentially-mounted thereabout, and with a brush handle perpendicularly mounted thereto. These shaped brushes facilitate cleaning hard to reach areas in a pool, especially by scrubbing with the ends thereof.

Cleaning and scrubbing pool surfaces puts a great deal of pressure on such pool brushes, especially the curved ends thereof which are used to scrub hard-to-reach corners of such pools, e.g., under stairs and ladders, and underneath diving boards. Accordingly, the ends of such oblong-shaped brushes tend to wear out first, decreasing effectiveness to clean pool corners, and even forcing the brush to be discarded before the center cylindrical portion is sufficiently used. Accordingly, the present invention versatilely allows the ends of such oblong-shaped pool brush to be customized for more difficult cleaning of hard-to-reach corners in a pool.

Therefore, it is an object of the present invention to improve scrubbing and cleaning of surfaces, e.g., in a swimming pool.

It is also an object of the invention to customize a cleaning brush for particular cleaning needs.

It is another object of the present invention to facilitate manufacture, assembly and maintaining a cleaning brush.

SUMMARY OF THE INVENTION

These and other objects are provided by a brush having a brush head in turn having a main body and bristles extending therefrom, with the main body formed as a cylindrical shaft with a rounded cylindrical circumference. Semispherical bodies having bristles extending therefrom are adapted to be removably secured to axially opposite ends of the main body. These bristles radially extend 360° around both the cylindrical circumference of the main body and each semispherical body. In a preferred embodiment, the semispherical ends are mounted to rotate with respect to the main body, to enhance cleaning and scrubbing.

The present invention advantageously provides a simple, efficient brush for easily cleaning and scrubbing, e.g., all corners of a pool where walls and floors come together, areas where different planar walls intersect, edge areas where walls meet floors, around stairs, seats and the like, while simultaneously being able to clean all other surface areas of a pool. Furthermore, the pool brush herein can clean the underside of pool steps without turning the brush over, which is a significant advantage.

Moreover, since the axial ends of the brush tend to wear out before the main body, e.g., due angling and pressing into hard-to-reach places such as the corners of a pool, the ends of the brush can be replaced without having to discard the entire brush. Additionally, other uses of such brush besides pool cleaning and scrubbing are enhanced, e.g., cleaning and scrubbing barbecue grilles. Versatility can be enhanced by providing bristles made of different material.

In this regard, the present invention is also directed to a handle for such a cleaning brush and that can be secured at one end to the brush itself depending upon intended uses. For example, the handle can have an opening at an opposite end from the brush to allow the brush to be hung on a hook.

Furthermore, the present invention is directed to a handle adapter that can be secured at one end thereof to the brush and configured to receive a separate handle secured thereto, thus allowing different size handles to be secured to the brush for different uses. For example, the brushes of the present invention, together with an appropriate handle or adapter, can be used for scrubbing boat decks, providing versatility scrubbing an entire deck, e.g., using a long handle, and also reaching under the boat rails.

The brush of the present invention can also be used to clean live wells, since the shape enhances cleaning both flat surfaces and corners at the same time. Recreational vehicles such as campers can be scrubbed and cleaned with the versatile combination of brush, handle, and optional handle adapter, which can be easily maneuvered to reach behind ladders and underneath rooftop equipment. Due to the shape of the brush itself, cleaning flat surfaces and corners at the same time are especially facilitated, e.g., inside storage bays. Cleaning and scrubbing indoor closets, bathrooms, canopy and canopy frames, are also facilitated.

The brush, together with an appropriate handle and optional adapter, can be effectively used as a house broom or mop, due to versatile ability to cover an entire floor and, at the same time, reach under cabinets and appliances. Ceiling fans can be easily reached, e.g., to clean dust from blades. The brush, handle, and optional adapter can reach into corners and behind commodes when cleaning bathrooms, along with effectively cleaning in and around tubs and showers. Exterior deck surfaces around a house can be effectively scrubbed and cleaned, including underneath railings of such decks. Interior and exterior of rain gutters can be easily and effectively scrubbed and cleaned, with paint easily and effectively removable from exterior surfaces of fences and sidings.

Cleaning industrial areas is also facilitated with the brush, handle, and optional adapter, e.g., in and around large machinery. Accumulated grease and waste can be especially effectively removed from industrial flooring.

BRIEF DESCRIPTION OF THE DRAWINGS

The present invention will be described in greater detail with reference to the accompanying drawings, wherein.

DETAILED DESCRIPTION OF PREFERRED EMBODIMENT(S)

Figure 1:
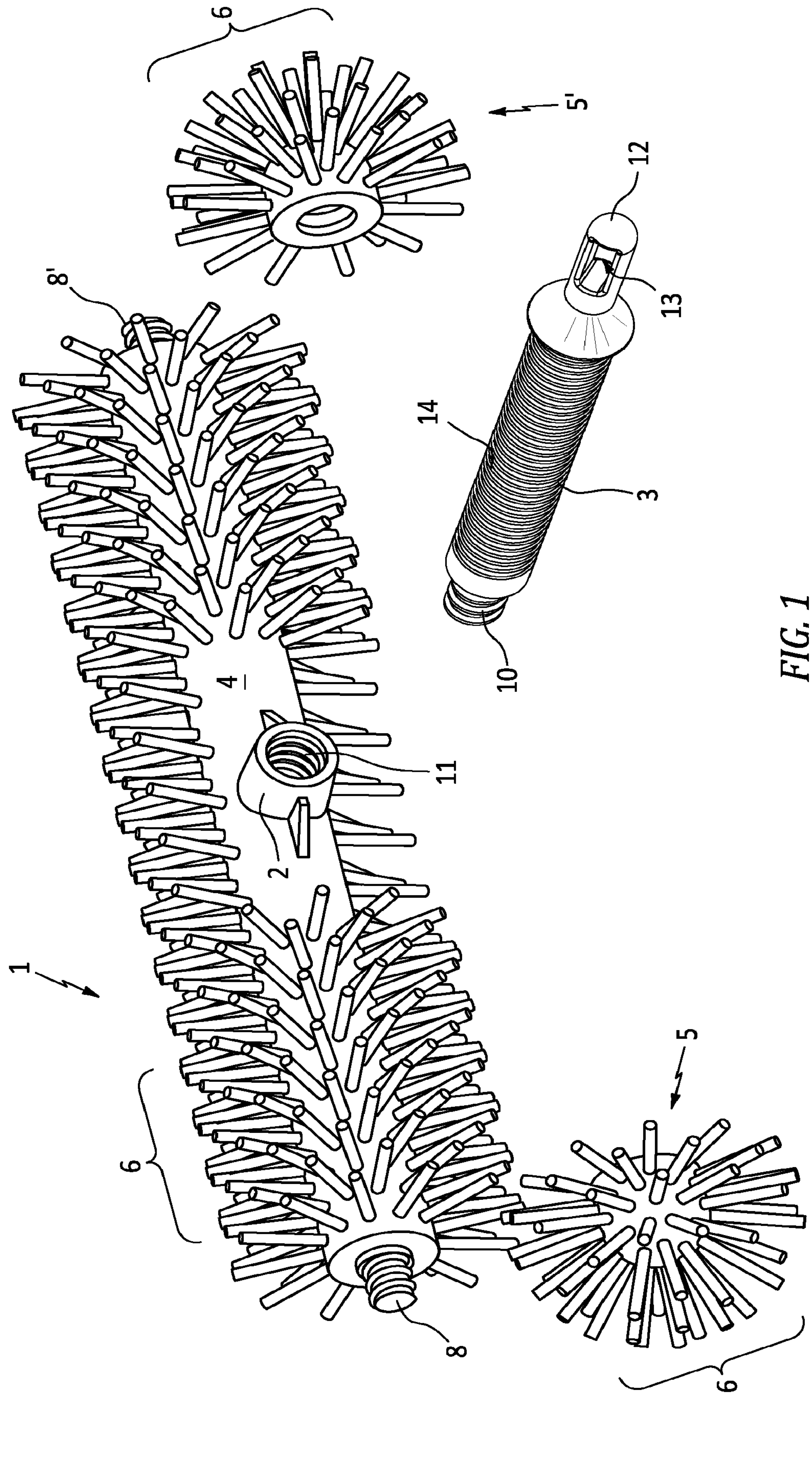
FIG. 1 is an exploded, perspective view of the brush and handle of the present invention.

It will be understood that any numerical range recited herein is intended to include all sub-ranges within that range.

It will be further understood that any compound, material or substance which is expressly or implicitly disclosed in the specification and/or recited in a claim, belongs to a group of structurally, compositionally and/or functionally related compounds, materials or substances includes individual representatives of the group and all combinations thereof.

A preferred embodiment of the pool brush includes a handle receiver 2 configured to receive an elongated handle 3, and a brush head 1 having a cylindrical body with rounded front, bottom and rear sides. The cylindrical body preferably has opposite semispherical rounded ends 5,5' and a mid-portion or main body 4 perpendicularly connected to the elongated handle 3, where the handle 3 is longer than the brush head 1.

The bristles 6 are perpendicularly mounted to the front, bottom and rear rounded surface sides, as well as to the semispherical rounded ends 5,5' of the brush head 1. A cross-sectional view of the cylindrical brush head 1 shows the bristles 6 extending outward in a 360° range. Mounting the bristles 6 on all the rounded surfaces of the brush head 1 allows the brush to be able to clean all interior and exterior pool surface areas as well as where walls intersect, walls meet floors, around stairs, and around pool seats. The bristles 6 on the top surface of the brush head 1 advantageously allow the brush to clean the underside of the pool steps without turning the brush over. The bristles can be made of natural or synthetic fibers, particularly nylon, polypropylene, polybutylene terephthalate and the like, and, as described below, can be of different lengths and hardness.

Figure 2:
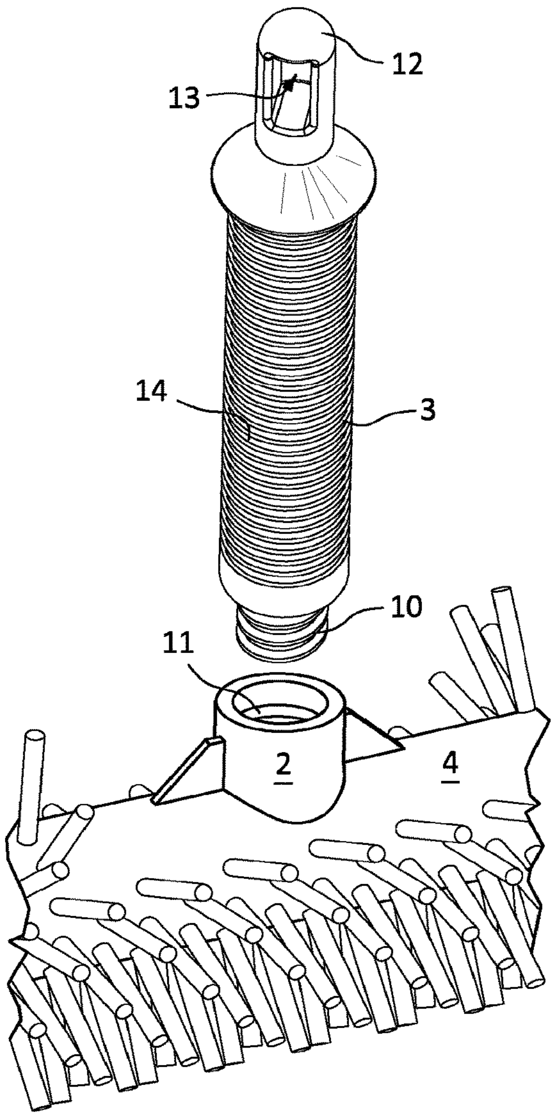
FIG. 2 is a rotated, perspective view of a center of the brush of FIG. 1, and schematically illustrating coupling the handle to the brush.
Figure 3:
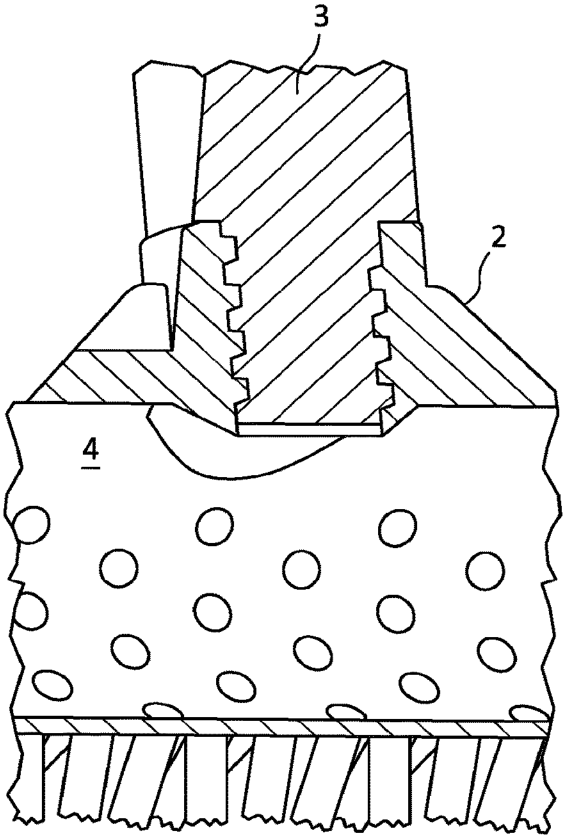
FIG. 3 is a partially sectional view of the center of the brush of FIG. 2, and illustrating securing of the handle to the brush.

Referring to FIGS. 1-3, brush includes a longitudinal handle receiver 2 having a threaded bore 11 extending into the main body 4 and within a collar protruding from the main body 4. The handle 3 has a threaded male end 10 adapted to be screwed into the threaded bore 11 to secure the handle 3 to the main body 4. An opposite end of the handle 3 has a clip 12 with a through-hole 13, to allow the brush and affixed handle 3 to be hung onto a hook. The shaft of the handle 3 is circumferentially surrounded by a ridged or fluted grip 14 manufactured from, e.g., polyvinyl chloride.

Figure 6:
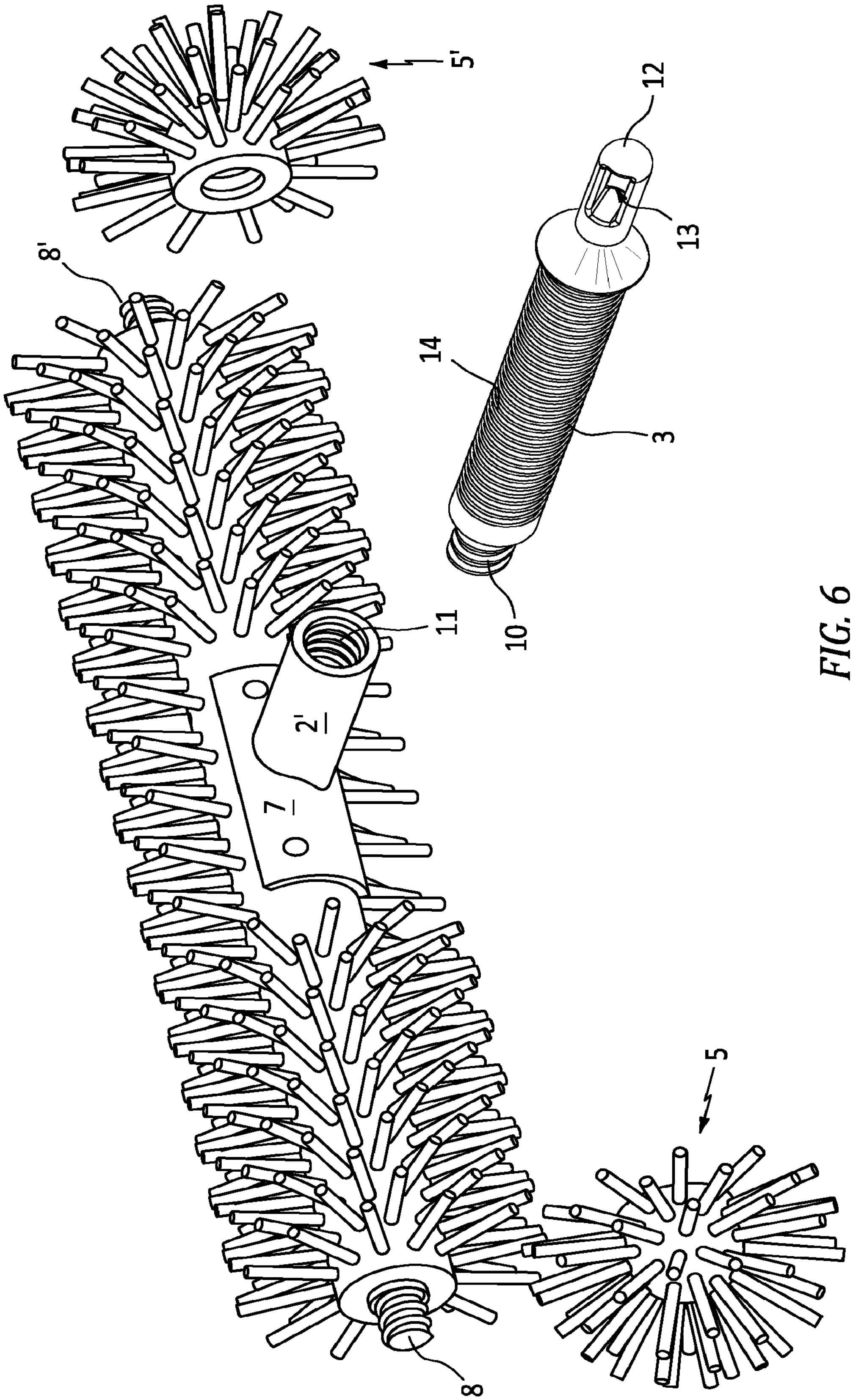
FIG. 6 is an exploded, perspective view similar to FIG. 1, and illustrating alternative coupling of the handle to the brush.

In an alternative embodiment illustrated in FIG. 6, the handle receiver 2' has a generally rectangular bottom plate 7 which can be removably engaged in a correspondingly shaped recess in the mid-portion of the top of the main body 4 of brush head 1 by conventional fasteners. As in FIGS. 1-3, handle receiver 2' preferably comprises a metal or plastic tubular member having an axial channel to receive an elongated handle 3. Handle 3 can be fabricated from metal (e.g., aluminum, stainless steel, etc.) or plastic (polyvinyl chloride, polycarbonate, etc.).

Main body 4 of the pool brush has a middle cylindrical portion, having a rounded circumference. Main body 4 further has opposite end portions 8,8'. The recess in the top of the main body 4 preferably has a depth equal to the thickness of plate 7 in the embodiment of FIG. 6, such that the top surface of plate 7 is flush with the exterior surface of the main body 4.

Main body 4 can have any length and diameter suitable for the purposes described herein. In an embodiment, main body 4 can have a length ranging from 4 inches to 12 inches, preferably about 8 inches. Generally, the pool brush is about 6 to 24 inches wide, i.e., from end-to-end. Opposite ends 8,8' can comprise male or female threads, arranged to, in turn, receive female or male threads from semispherical ends 5, 5' to be removably secured to the main body 4 as shown, e.g., in FIGS. 1 and 4-7. Main body 4 along with the semispherical end portions 5, 5' can be formed from injection molded plastic, metal such as aluminum or stainless steel, and the like.

Bristles 6 extend radially around the circumference of the main body 4, and also all around the semispherical end portions 5, 5'. These bristles 6 can comprise alternating arrays of bundles of short bristles and bundles of long bristles.

Moreover, bristles 6 can have different densities to be alternatingly hard and soft. For example, bundles of long bristles can comprise relatively soft bristles and bundles of short bristles can be relatively harder (or stiffer) bristles, or vice versa. The difference in hardness of the bundles can be achieved by increasing the number of bristles 6 in a bundle. Alternatively, the difference in hardness can be achieved by using different materials to fabricate the bristles 6 of the different bundles. For example, the softer bristles 6 can be fabricated from nylon while the stiffer bristles 6 can be fabricated from polypropylene or polybutylene terephthalate.

Figure 4:
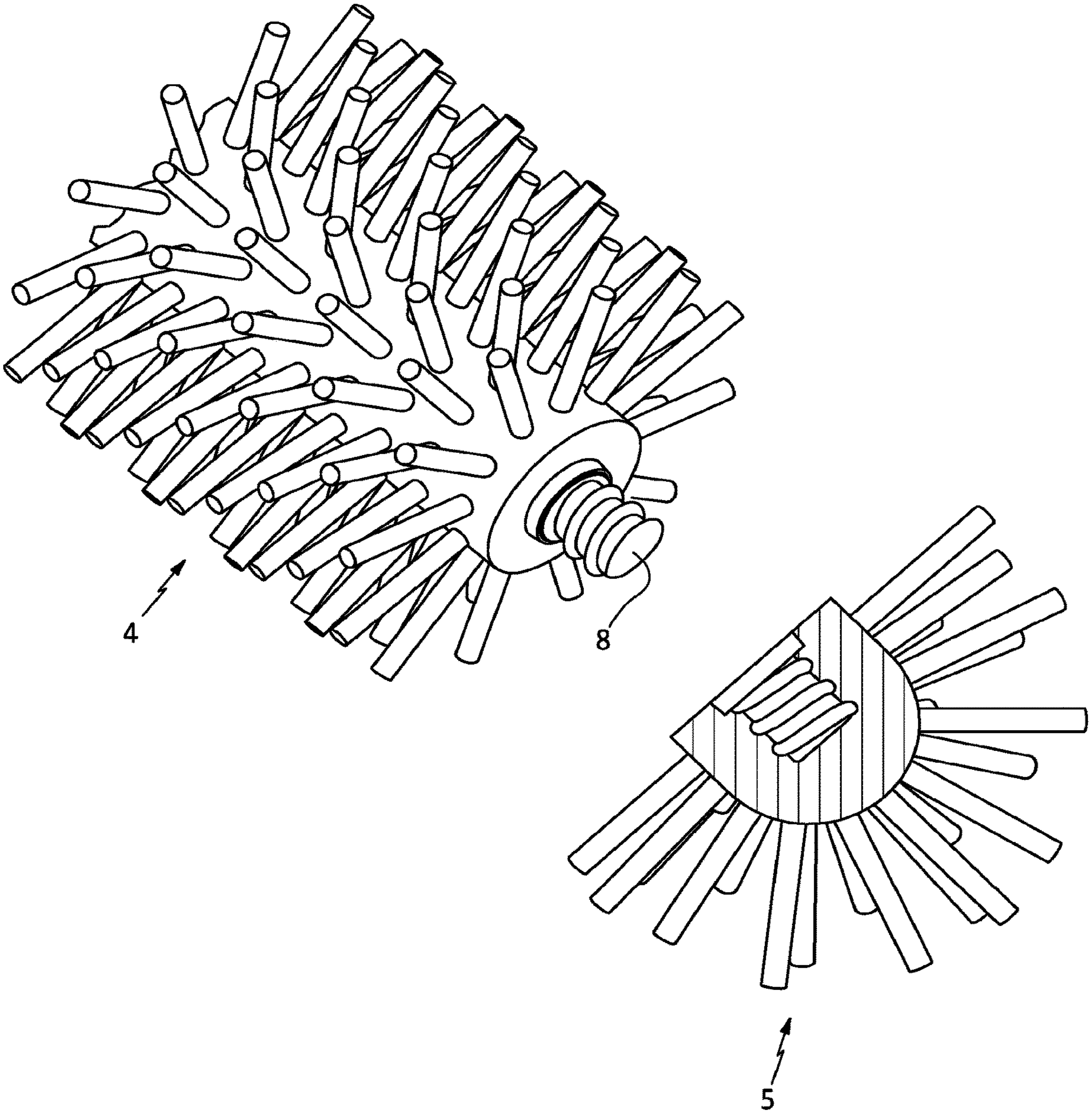
FIG. 4 is a perspective, partially sectional view of one end of the brush of FIG. 1, and schematically illustrating coupling an end to a main body thereof.
Figure 5:
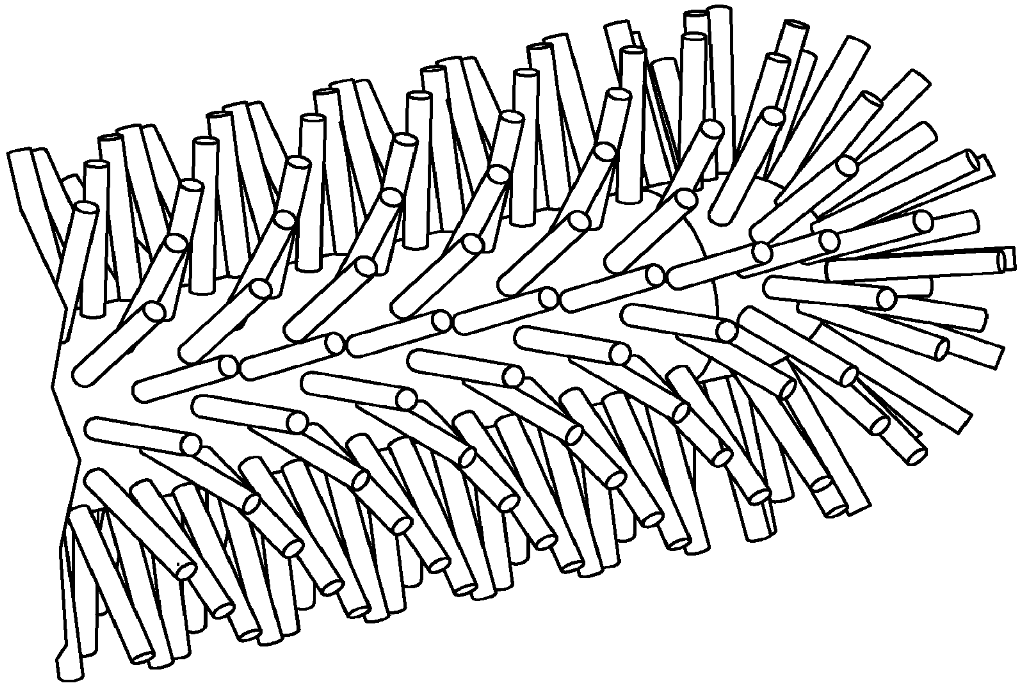
FIG. 5 is a rotated, perspective view of the end of the brush of FIG. 4, and illustrating securing of the end and main body together.

As shown in FIG. 4, the axial ends 8,8' of the main body 4 comprise protruding threaded male members arranged to mate with internally-threaded bores in the semispherical ends 5,5, thereby forming a composite brush as illustrated, e.g., in FIG. 5. This allows the semispherical ends 5,5' of the brush to be removed and replaced as needed, and also increasing versatility in scrubbing a pool of deposits. For example, corners of the swimming pool which are hard to reach are better reachable by the semispherical ends 5,5' of the brush, which might require harder bristles for cleaning. Thereby, greater pressure can be provided by these semispherical ends 5,5' of the brush with harder bristles than found, e.g., on the main body adapted for just general scrubbing of a pool surface.

Accordingly, bristles 6 of different hardness can be provided on the ends 5,5' of the pool brush from the main portion 4. At the same, pressure applied on these ends 5,5' of the brush might cause greater and more immediate wearing down of the bristles 6, than on the main body 4 of the brush. Therefore, instead of having to dispose of the entire pool brush when the scrubbing ends 5,5' wear down, these ends 5,5' can be unscrewed from the main body 4, and replaced with brand new semispherical brush ends 5,5', greatly extending the life of the pool brush.

Figure 7:
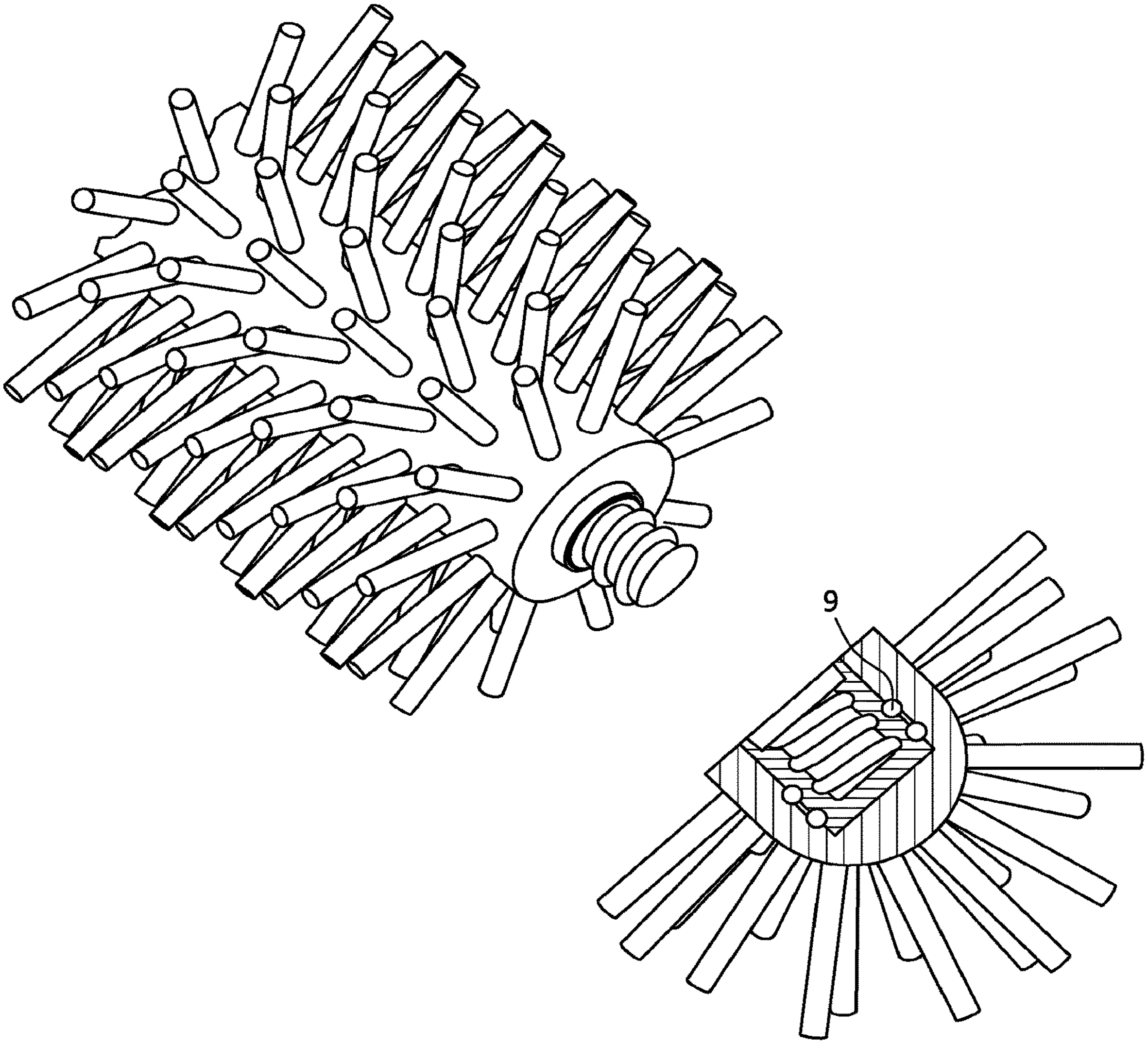
FIG. 7 is a perspective, partially sectional view similar to FIG. 4, and illustrating one end of the brush being movably mounted for rotation.

Moreover, in the embodiment illustrated in FIG. 7, the semispherical ends 5,5' can be additionally mounted for individual rotation with respect to the main body 4, through bearings 9. This greatly enhances ability to clean surfaces of the pool, especially the corners where rubbing the brush end 5,5' against a corner or surface will cause such end 5,5' to rotate. While the semispherical ends 5,5' will be caused to manually rotate upon scrubbing, a motor for individually rotating these ends 5,5' can also be provided along with batteries for operating the same.

Additionally, the main body 4 can be formed, e.g., with a wooden shaft, while the bristles 6, notably on the ends 5,5' of the brush, can be manufactured from a composite of various material, to enhance cleaning for specific needs and applications. For example, bristles 6 can be provided from polypropylene along with additives to enhance flexibility, or a combination of polypropylene with fiberglass to enhance strength.

In an alternative application, the bristles 6 can be made from stainless steel for, e.g., cleaning grilles. A polypropylene/stainless steel composite for the bristles 6 can also be provided. In this regard, polypropylene is especially suited for brushes used in the commercial pool industry, while polyvinyl chloride is especially suited for backyard pools and general cleaning of backyard surfaces. Polyethylene terephthalate functions extremely well in a houseware brush, e.g., a broom, because bristles made therefrom will be soft. Polybutylene terephthalate bristles are especially suitable on cleaning brushes used for boating and recreational vehicles.

Figure 10:
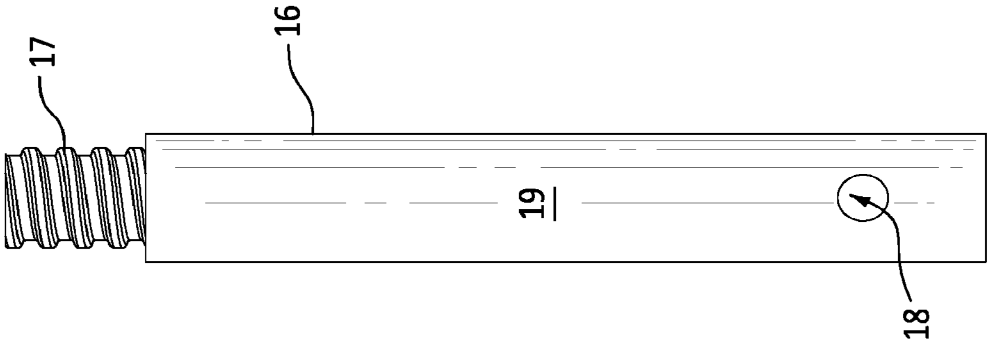
FIG. 10, is a side elevational view of the adapter of FIG. 8 rotated 180°.
Figure 9:
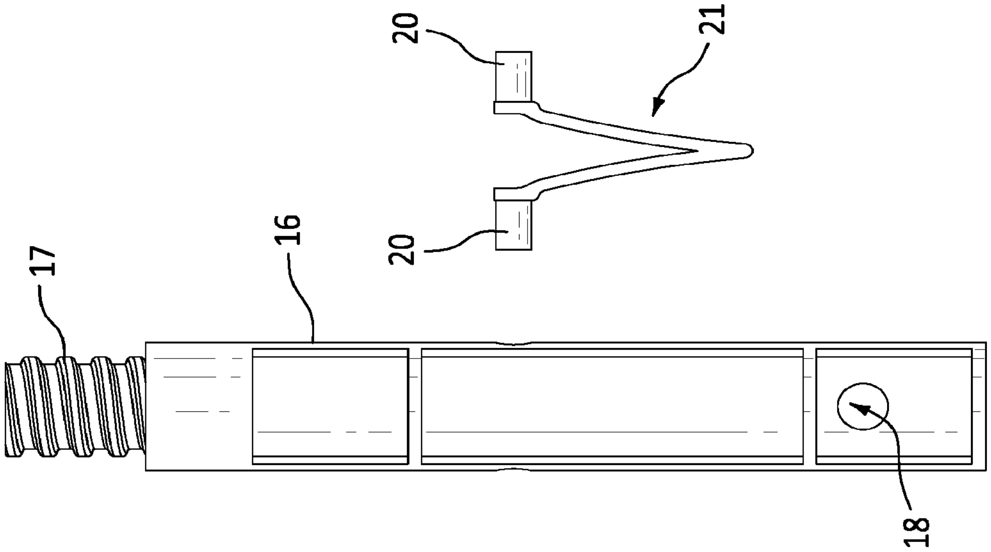
FIG. 9 is a side elevational side view similar to FIG. 8, with the V-clip removed and situated adjacent to the adapter.
Figure 8:
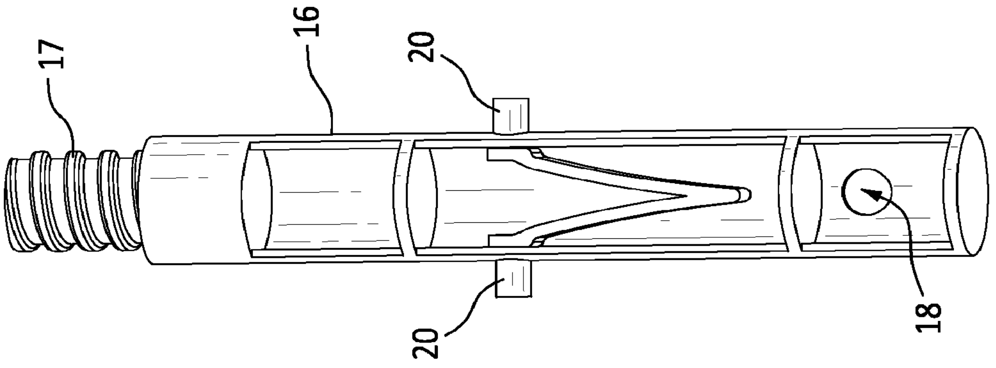
FIG. 8 is a side elevational view of an adapter for a brush and handle with a V-clip inserted therein.

FIGS. 8-10 illustrate an adapter 16 for intercoupling the brush and a handle. More particularly, the adapter 16 is hollow and has a threaded male end 17 for screwing into the threaded bore 11 of the handle receiver 2 of the brush. One axial side of the adapter 16 is open as shown in FIGS. 8 and 9, while the other side 19 of the adapter 16 is provided with a through-hole 18, e.g., for hanging on a hook. The adapter can be made of metal or plastic.

Diametrically-opposite radial openings are provided through the adapter 16, to receive outwardly-biased tips 20 of a V-clip 21 manufactured from, e.g., synthetically resilient material. A concentrically-larger handle, i.e., with an internal diameter slightly larger than the external diameter of the adapter 16, can be slid over the end of adapter 16 opposite the male threaded end 17 with openings in the handle then slid over and coupled to the protruding tips 20 of the V-clip 21 to secure the handle and adapter 16 together, and thereby secure the handle to the brush.

Figure 11:
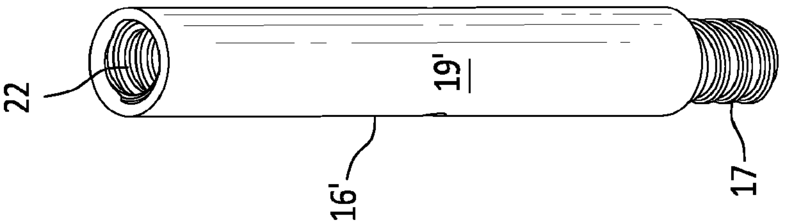
FIG. 11 is a perspective view from above of an alternative embodiment of an adapter.

With this coupling, handles of different length can be secured to the brush for different purposes. For example, longer handles can be effectively secured to the brush for use analogously to a broom or mop, i.e., with a user able to stand upright. In further alternative embodiments of the adapter, the entire outer cylindrical circumference 19' of the adapter 16' can be continuous as shown in FIG. 11, and with the adapter 16' additionally provided with an internally female-threaded end 22 opposite the male threaded end 17. In this embodiment, a handle having a concomitantly male threaded end can be screwed onto the female threaded end 22 of the adapter 16', to secure the handle to the adapter 16' and hence, to the brush screwed onto the opposite male threaded end 17.

Figure 12:
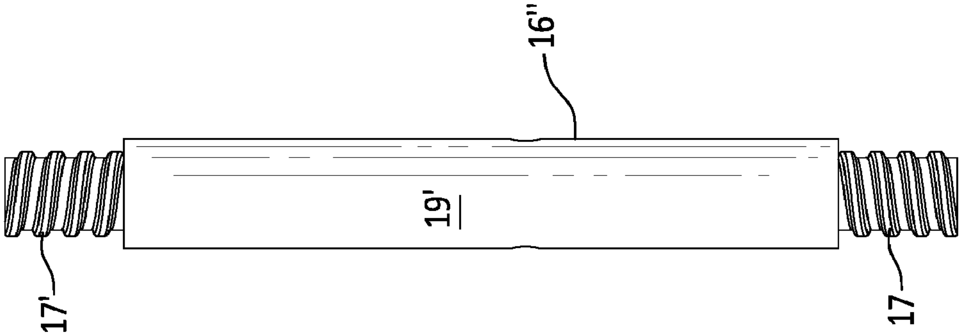
FIG. 12 is an elevational side view of a further alternative embodiment of an adapter.

A further variant of an adapter 16" can be provided with two opposite male threaded ends 17 and 17' as shown in FIG. 12. In this embodiment, a handle having a concomitantly female threaded end can be screwed onto one of the male threaded ends 17, 17' of the adapter 16". This particular embodiment improves ease of intercoupling a handle and the brush because each of the male threaded ends 17, 17' can be screwed into the threaded bore 11 of the handle receiver 2 of the brush, or the concomitantly female threaded end of the handle.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A cleaning brush comprising a brush head having a main body and bristles extending from said main body, said main body having a cylindrical shaft with a rounded cylindrical circumference, semispherical bodies having bristles extending therefrom and adapted to be removably secured to axially opposite ends of said main body, and said bristles radially extending 360° around both the cylindrical circumference of said main body and each said semispherical body, wherein said main body and semispherical bodies comprise means for securing said semispherical bodies to the main body, and said securing means comprise male threads protruding from one of the axially opposite ends of said main body or said semispherical bodies, and female threads set into the other of the axially opposite ends of said main body or said semispherical bodies.

2. The brush of claim 1, wherein said male threads protrude from the axially opposite ends of said main body, and the female threads are set into the semispherical bodies.

3. The brush of claim 1, further comprising a handle receiver mounted upon the circumference of the main body.

4. The brush of claim 3, wherein said handle receiver is mounted approximately equidistantly from the axially-opposite ends of the main body.

5. The brush of claim 3, wherein said handle receiver comprises a threaded hole extending into said main body and configured to receive a complementary-threaded end of a handle for the brush.

6. The brush of claim 3, wherein the handle receiver comprises a tubular member and a bottom plate attached to the tubular member, and the main body has a recess on the circumference configured and dimensioned to receive the bottom plate of the handle receiver.

7. The brush of claim 5, further comprising an elongated handle having the complementary-threaded end and configured to be removably screwed into the threaded hole into the main body, to secure the main body and handle together.

8. The brush of claim 1, including longer and shorter bristles in an array of bundles.

9. The brush of claim 8, wherein a bundle of bristles includes relatively stiffer bristles and relatively softer bristles.

10. The brush of claim 1, wherein the bristles are fabricated from at least one of nylon, polyvinyl chloride, polypropylene terephthalate, polyethylene terephthalate, or polybutylene terephthalate.

11. The brush of claim 1, wherein the bristles are fabricated from a stainless steel, or a mix of polypropylene and steel.

12. A cleaning brush comprising a brush head having a main body and bristles extending from said main body, said main body having a cylindrical shaft with a rounded cylindrical circumference, semispherical bodies having bristles extending therefrom and adapted to be removably secured to axially opposite ends of said main body, and said bristles radially extending 360° around both the cylindrical circumference of said main body and each said semispherical body, wherein said semispherical bodies are each configured to rotate about said axially-opposite ends of the main body when mounted thereon.

13. The brush of claim 12, wherein each said semispherical body is mounted to rotate about a bearing situated therein, when mounted upon the main body.

14. A cleaning brush comprising a brush head having a main body and bristles extending from said main body, said main body having a cylindrical shaft with a rounded cylindrical circumference, semispherical bodies having bristles extending therefrom and adapted to be removably secured to axially opposite ends of said main body, and said bristles radially extending 360° around both the cylindrical circumference of said main body and each said semispherical body, wherein the bristles on the semispherical bodies are composed of a material having a different hardness from a material of the bristles on the main body.

15. The brush of claim 14, wherein the bristles on the semispherical bodies are harder than the bristles on the main body.

16. The brush of claim 14, wherein the bristles on the semispherical bodies are softer than the bristles on the main body.

* * * * *